T. A. CHANDLER.
Pendulum Level.
No. 9,722.
Patented May 17, 1853.
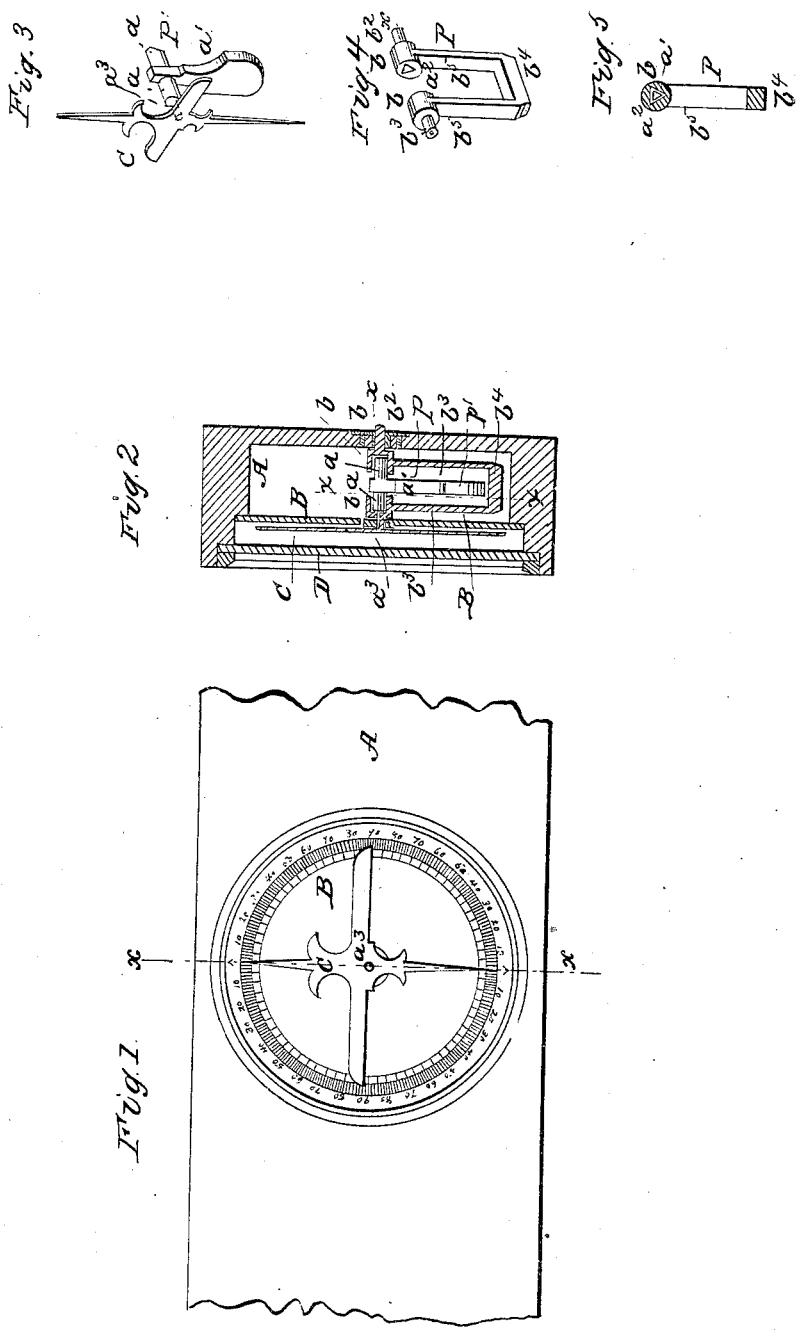

UNITED STATES PATENT OFFICE.

THOMAS A. CHANDLER, OF ROCKFORD, ILLINOIS.

PENDULUM-LEVEL.

Specification of Letters Patent No. 9,722, dated May 17, 1853.

*To all whom it may concern:*

Be it known that I, THOMAS A. CHANDLER, of Rockford, in the county of Winnebago and State of Illinois, have invented certain new and useful Improvements in Pendulum-Levels, of which the following is a full, clear, and exact description, reference being had to the accompanying drawing, which makes part of this specification, and in which—

Figure 1 represents a front elevation of the instrument, Fig. 2 a transverse vertical section at the line $x$ $x$ of Fig. 1, Fig. 3 a view in perspective of the indicator, axis and pendulum detached, Fig. 4 represents a view of the rotating pendulum bearing that supports the axis of the indicator, and Fig. 5 is a transverse section at the line $x$ $x$ of Fig. 2.

My invention and improvement consists in supporting the knife edges or bearings of the axle of pendulums of indicators in a hollow or concave, angular or knife-edge bearings formed in the turning axle of a second pendulum, whereby changes in the position of the support of the pendulum are more accurately measured by the indicator.

The level represented in the drawing is of the pendulum variety as improved by me many years ago, with the improvements added which I have subsequently made and which constitute the subject matter of my present claims.

The stock (A) of the level is rectangular, its thickness should be about one third of its height and its length from four to eight times its width, it may be made of well seasoned mahonany, or cast iron, the latter I prefer because it is not as liable to be injured as the former, but any other material may be employed that the constructor prefers.

In the front of the stock a deep cavity is made to receive the pendulums (P, P'), the disk (B) for the graduated circle, indicator (C), and a plate of glass (D) to cover the cavity and protect the indicator and graduated circle. At the center of the back of the cavity a bearing ($b'$) is made for the back journal ($b^2$) of the axle ($b$) of the pendulum (P). at the center of the disk (B) a corresponding bearing is made for the front journal ($b^3$) of the axle of this pendulum. The axle ($b$) is bent into a form resembling a bell-yoke, as represented in the drawing, the part ($b^4$) corresponding to the arch of the yoke, being made heavy so as to perform the function of a pendulum ball as well as that of an axle, the portions ($b^5$) of the axle bent at right angles to its journals and which constitute the suspension bars of the pendulum, are placed at such a distance apart as will conveniently admit and allow free play to the ball and rod of the pendulum (P'); the rod ($a'$) of this pendulum is suspended from an axle ($a$) which has knife-edge bearings that rest in cavities ($a^2$) of a corresponding angular shape, but slightly more obtuse, formed in the adjacent inner ends of the horizontal portion of the axle ($b$) from which the journals ($b^2$, $b^3$) project. A pivot ($a^3$) concentric with the axis of oscillation of the pendulum (P) projects from the front end of the axis ($a$) of the pendulum (P') through the hollow journal ($b^3$) to the front of the disk (B) to support the indicator which is firmly attached to it. By this arrangement the inner or small pendulum is left free to move, independent of the outer or larger pendulum, so far as this freedom is necessary to the accuracy and delicacy of its indications of minute changes, in the position of the common stock, or common support of both pendulums, but whenever the position of the support is moved considerably the large pendulum is correspondingly moved so as to hold the bearings for the indicator pendulum in the proper position.

By supporting the knife edges of the indicating pendulum in angular bearings, an instrument is made at once sensitive and which will quickly find its equilibrium and be at rest, and is hence better adapted to the ordinary uses of a plumb rule or level.

Whenever the indicator in consequence of its great sensitiveness is too slow in assuming a state of rest, the application of slight pressure by the finger of the operator to the projecting extremity ($x$) of the journal of the outer pendulum, will quickly obviate this difficulty.

The turning of the instrument does not produce abrasion on the knife-edges, when arranged in turning bearings by which they are carried, as it would were they supported in fixed bearings; therefore the instrument is much less liable to get out of order. Moreover when the bearing is fixed, the cavity in which the knife-edge rests must be a hollow cylinder, which will not confine the knife edge in any definite part of its lower surface, but will allow it to move about to an extent that will render the indications in some degree irregular and inaccurate; by causing the bearing to turn as described this difficulty is avoided.

The construction of every part of the instrument may be very considerably varied, without any departure from the principle of my invention, provided the sensitive indicating pendulum be hung on a knife-edge in a narrow self turning and adjusting support, which moves with the requisite promptness to keep the narrow part of the cavities of the bearings beneath the knife-edges.

What I claim as my invention and desire to secure by Letters Patent is—

The method of supporting the angular journals of the axle of a pendulum indicator, in turning and self adjusting bearings of similar form to the angular journals, substantially as herein set forth.

In testimony whereof I have hereunto subscribed my name.

THOS. A. CHANDLER.

Witnesses:
P. H. WATSON,
JOHN L. SMITH.